2,894,034
STABILIZED PHENYLENE DIAMINES

Peter O. Shull, Elizabeth, N.J., assignor to General Aniline & Film Corporation, New York, N.Y., a corporation of Delaware No Drawing. Application July 31, 1956
Serial No. 601,126

9 Claims. (Cl. 260—578)

The present invention relates to phenylene diamines which are stabilized against discoloration and decomposition by heat, light and atmospheric oxidation.

Aromatic diamines are used as intermediates for the preparation of dyestuffs, resins, especially epoxy resins, and diisocyanates for foamed plastics. Light color, and stability of composition are of considerable importance in all of these uses. Hitherto it has not been possible to obtain sufficient stability in some of the most useful of the aromatic diamines, i.e., phenylene diamines, so as to manufacture a flaked product or powder. This is a serious limitation in their commercial handling.

One method of imparting partial stability to the phenylene diamines is to introduce an inert atmosphere such as nitrogen over the diamine during storage and to use light-proof storage containers. This, however, is objectionable because the treatment is temporary and upon further handling or processing the stability is easily lost.

Another method is to stabilize aromatic amines with aromatic mercaptans, zinc aromatic mercaptides, zinc salts of the aromatic mercaptans, alkali metal and zinc salts of N-substituted dithiocarbamic acids such as, for example, sodium dimethyl dithiocarbamate, disodium ethylene bis-dithiocarbamate, zinc pentamethylene dithiocarbamate, etc. The aromatic mercaptans invert to prooxygenic catalysts and are inoperative with phenylene diamines. The alkali and zinc salts of N-substituted dithiocarbamates actually accelerate the oxidation of not only the phenylene diamines, but also of aniline and m-toluidine. The zinc aromatic mercaptides or zinc salts of aromatic mercaptans, while effective for certain aromatic amines, are not readily available in the chemical market and are costly to synthesize.

Organic sulfur containing compounds, such as carbon disulfide, phosphorus sulfide reaction product of a phenolic compound, etc., which have been previously proposed, tend to liberate hydrogen sulfide which is toxic, obnoxious, and presents explosion and corrosion hazards. Moreover, they are inoperative with certain types of aromatic amines and actually increase the susceptibility of such amines to oxidation.

It is an object of the present invention to provide phenylene diamines which are stabilized against atmospheric oxidation and against deterioration during storage.

Another object is to provide a novel method for stabilizing phenylene diamines against discoloration and decomposition by heat, light and air.

Further objects and advantages will become manifest from the following description:

I have found that phenylene diamines, i.e. o-, m-, and p-phenylene diamines, are readily and efficiently stabilized against oxidation and deterioration by the addition of elemental sulfur to such diamines or by distilling the diamines from a mixture of elemental sulfur and the diamine. The unusual advantage of this invention is the fact that the need for preparing complex sulfur containing products, that are often used for stabilization, are eliminated. Another important feature of this invention is the ease with which the elemental sulfur can be introduced into the process prior to distillation of the phenylene diamine. The addition of elemental sulfur has a very marked effect on the stability of the phenylene diamines in a very wide range; as little as 0.1% sulfur added by weight yields excellent stability even under accelerated test conditions at temperatures of 90° C. as compared to phenylene diamines which have not been treated with sulfur.

The concentration of elemental sulfur in the phenylene diamine may vary from about 0.01% to about 4% by weight. Usually about 0.01 to 3.5% by weight is very effective for anyone of the isomeric phenylene diamines.

In order to more clearly illustrate the invention and to show the preferred mode of carrying the same into effect, and the advantages resulting therefrom, the following examples are given:

Example I

Crude m-phenylenediamine was distilled in the usual manner at 130–133° C. and reduced pressure of 2 mm. mercury and a sample of the distillate taken. To 100 grams of the distillate was added 0.5% sulfur by weight, and another 100 gram portion of the distillate was left untreated. Both samples were exposed to 90° C. temperature for 18 hours. The untreated sample soon became dark and tarry while the treated sample remained stable.

Example II

Example I was repeated with the exception that only 0.01% sulfur was added. After 18 hours at 90° C. the treated sample remained stable while the untreated sample darkened in color.

Example III

Crude o-phenylenediamine was distilled in the usual manner at a temperature of 135–140° C. and reduced pressure of 15–17 mm. mercury pressure. To 30 grams of the distillate was added 0.1 gram of sulfur, and another 30 gram portion of the distillate was left untreated. Both samples were subjected to 90° C. for 16 hours. The treated sample showed no discoloration over the untreated dark and tarry sample.

Example IV

Crude m-phenylenediamine, 100 grams, and 2 grams of sulfur were distilled concomitantly at 130–133° C. and 2 mm. mermury pressure in the customary manner. The distillate and a blank sample of untreated distilled m-phenylenediamine was held at 90° C. for 18 hours. The normal discoloration and decomposition of the untreated sample were not evident in the stabilized sample.

Example V

Crude m-toluenediamine, 100 grams, and 2 grams of sulfur were distilled concomitantly under reduced pressure of 1–2 mm. mercury and at a temperature of 125–126° C. The distillate and a blank sample of untreated distilled m-toluenediamine was held at 90° C. for 16 hours. The normal discoloration and decomposition of the untreated sample was not evident in the stabilized sample.

I claim:
1. A stabilized composition of matter consisting of an unsubstituted phenylene diamine containing from 0.01% to 4% of elemental sulfur.
2. A stabilized composition of matter according to claim 1, wherein the phenylene diamine is o-phenylene diamine.
3. A stabilized composition of matter according to claim 1, wherein the phenylene diamine is m-phenylene diamine.

4. A stabilized composition of matter according to claim 1, wherein the phenylene diamine is p-phenylene diamine.

5. The method of stabilizing an unsubstituted phenylene diamine which consists in adding to said diamine from 0.01% to 4% of elemental sulfur.

6. The method according to claim 5, wherein the phenylene diamine is m-phenylene diamine.

7. The method according to claim 5, wherein the phenylene diamine is o-phenylene diamine.

8. The method according to claim 5, wherein the phenylene diamine is p-phenylene diamine.

9. The method of stabilizing an unsubstituted phenylene diamine which consists in distilling said diamine under reduced pressure in the presence of 0.01% to 4% of elemental sulfur.

References Cited in the file of this patent

UNITED STATES PATENTS

| | | |
|---|---|---|
| 2,140,545 | Pier et al. | Dec. 20, 1938 |
| 2,184,040 | Garner | Dec. 19, 1939 |